United States Patent
Nyarko et al.

(10) Patent No.: US 10,333,620 B2
(45) Date of Patent: Jun. 25, 2019

(54) SYSTEM AND METHOD FOR LIGHTING AND BUILDING OCCUPANT TRACKING

(71) Applicant: Morgan State University, Baltimore, MD (US)

(72) Inventors: Kofi Nyarko, Essex, MD (US); Christian Emiyah, Baltimore, MD (US); Samuel Mbugua, Baltimore, MD (US)

(73) Assignee: Morgan State University, Baltimore, MD (US)

( * ) Notice: Subject to any disclaimer, the term of this patent is extended or adjusted under 35 U.S.C. 154(b) by 0 days.

(21) Appl. No.: 15/949,208

(22) Filed: Apr. 10, 2018

(65) Prior Publication Data

US 2018/0234181 A1    Aug. 16, 2018

Related U.S. Application Data

(63) Continuation-in-part of application No. 15/430,904, filed on Feb. 13, 2017, now Pat. No. 9,973,275.

(60) Provisional application No. 62/293,867, filed on Feb. 11, 2016.

(51) Int. Cl.
| | |
|---|---|
| *G01S 1/70* | (2006.01) |
| *H04W 4/33* | (2018.01) |
| *H04W 4/029* | (2018.01) |
| *H04W 64/00* | (2009.01) |
| *H04B 10/116* | (2013.01) |

(52) U.S. Cl.
CPC ............ *H04B 10/116* (2013.01); *G01S 1/70* (2013.01); *H04W 4/029* (2018.02); *H04W 4/33* (2018.02); *H04W 64/00* (2013.01)

(58) Field of Classification Search
CPC . H04B 10/11–116; G01S 1/70; G01S 5/0027; G01S 11/12; H04W 64/00
See application file for complete search history.

(56) References Cited

U.S. PATENT DOCUMENTS

| | | | | |
|---|---|---|---|---|
| 6,014,236 A | * | 1/2000 | Flaherty | H04B 10/114 359/356 |
| 6,865,347 B2 | | 3/2005 | Perkins et al. | |
| 7,969,297 B2 | | 6/2011 | Haartsen et al. | |
| 2003/0151600 A1 | * | 8/2003 | Takeuchi | G06F 1/1626 345/204 |
| 2006/0072919 A1 | * | 4/2006 | Edelist | H04B 10/1149 398/135 |
| 2010/0054755 A1 | * | 3/2010 | Kwon | H04B 10/1143 398/170 |
| 2013/0028475 A1 | | 1/2013 | Ganick et al. | |

(Continued)

*Primary Examiner* — Casey L Kretzer
(74) *Attorney, Agent, or Firm* — Whiteford, Taylor & Preston, LLP; Gregory M. Stone (57) ABSTRACT

Disclosed is a system and method for using visible light communication ("VLC") to perform indoor position location. Through use of a system and method configured as set forth herein, the position of any appropriately marked person or item may be found indoors using data interconnected modules that communicate with one another via RF and visible light. A mobile receiver in the form of a tag or badge attached to the person or item to be tracked receives a VLC signal from a plurality of lighting modules, and transmits back to a mesh network formed by the modules the data it received to determine the tag's or badge's physical position with respect to the individual network modules.

21 Claims, 6 Drawing Sheets

(56) References Cited

U.S. PATENT DOCUMENTS

| | | | | |
|---|---|---|---|---|
| 2014/0280316 A1* | 9/2014 | Ganick | ............ | G06F 17/30522 |
| | | | | 707/769 |
| 2014/0341588 A1* | 11/2014 | Pederson | ............... | H04B 10/40 |
| | | | | 398/128 |
| 2015/0023023 A1* | 1/2015 | Livesay | ................ | H01L 33/642 |
| | | | | 362/294 |
| 2015/0042240 A1* | 2/2015 | Aggarwal | ............... | H04W 4/70 |
| | | | | 315/292 |
| 2015/0043924 A1* | 2/2015 | Yoo | ..................... | H04B 10/116 |
| | | | | 398/118 |
| 2016/0352424 A1* | 12/2016 | Kido | ................... | H04B 10/116 |

* cited by examiner

SYSTEM AND METHOD FOR LIGHTING AND BUILDING OCCUPANT TRACKING

CROSS REFERENCE TO RELATED APPLICATION

This application is a continuation-in-part of U.S. patent application Ser. No. 15/430,904 entitled "System and Method for Lighting and Building Occupant Tracking," filed with the U.S. Patent and Trademark Office on Feb. 13, 2017 by the inventors herein, which application is based upon and claims benefit of U.S. Provisional Patent Application Ser. No. 62/293,867 entitled "Building Occupant Lighting and Tracking System," filed with the U.S. Patent and Trademark Office on Feb. 11, 2016 by the inventors herein, the specifications of which are incorporated herein by reference in their entireties.

GOVERNMENT RIGHTS

This invention was made with government support under Grant No. EEC-0812056 awarded by the National Science Foundation. The government may have certain rights in the invention.

FIELD OF THE INVENTION

This invention relates generally to indoor positioning systems, and more particularly to systems and methods for indoor position detection and tracking using visible light communication.

BACKGROUND OF THE INVENTION

The installation of "Smart Building" technologies is rapidly becoming the norm in both new construction and in modernization of legacy buildings. It has been estimated that in the United States alone, $289 billion worth of building efficiency investment would produce savings in excess of $1 trillion in operating expenses. Every dollar invested in these Smart Building technologies returns $3 in savings. The savings are primarily in energy (climate control), electricity usage (lighting) and water usage. Layered on top of this is the need in many buildings for enhanced security and safety systems, which systems may add significant expense.

Various companies have been working on providing Indoor Position System ("IPS") solutions for the past two decades with varying degrees of accuracy, cost and reliability. Some companies, such as Ekahau and AeroScout, use active Radio Frequency Identification (RFID) tags that occupants wear to determine when an occupant passes a RFID reader (receiver). The accuracy of this approach is limited to the number of receivers available through the building, which is often cost limited. For secure environments where radio frequency emissions are restricted to prevent unauthorized information access and possibly data manipulation, RFID approaches are not practical. Other companies, such as Meridian and Accuware, rely on the use of mobile phones for IPS. There are several ways that this can be accomplished, such as the use of WiFi access points and Bluetooth technology, both of which falls under the class of Distributed Antenna Systems (DAS) that involves the measurement of signal strength or power levels of radio signals to calculate distance from anchor objects. Lately, companies such as Apple, Google, and Awarepoint are popularizing a particular approach called Bluetooth Beaconing, which utilizes the Bluetooth Low Energy standard. The density and quantity of Bluetooth beacons and WiFi access points is critical to the accuracy of this approach, and as such serves as its major limitation. Other non-RF based techniques, such as passive infrared and acoustic occupancy sensing are also available on the market, but these approaches are only suitable for zone/room occupancy detection and not the fidelity and discrimination required for occupant tracking. Companies such as GeoVision use computer vision techniques to detect occupants through surveillance feeds at key points within the building. However, this approach can be among the most expensive, costing over 3 times that of competing solutions. Another company, Savi Technology, employs frequency shift keying (FSK), and their technology is primarily used for asset tracking within the DoD.

SUMMARY OF THE INVENTION

Disclosed is a system and method for using visible light communication ("VLC") to perform indoor position location. Through use of a system and method configured as set forth herein, the position of any appropriately marked person or item may be found indoors using data interconnected modules that communicate with one another via RF and visible light. A mobile receiver in the form of a tag or badge attached to the person or item to be tracked receives a VLC signal from a plurality of lighting modules, and transmits back to a processor the data it received so that the processor is able determine the tag's or badge's physical position with respect to the individual network modules.

The system and method set forth herein use VLC to accomplish IPS at little more than the cost of traditional LED lighting retrofit or installation. This technology is well suited for secure environments, in which RF leakage cannot be tolerated.

The system and method set forth herein perform comprehensive building occupant tracking using lighting modules. The technology involves the use of a Light Emitting Diode (LED) lighting module designed to be interconnected with other lighting modules for the purpose of both energy efficient illumination and indoor occupant tracking when combined with a tag carried by each individual or item being tracked. Each module is comprised of a bank of high lumen VLC LEDs that serve two purposes: namely, (1) provide illumination, and (2) communicate with the remote tag. In addition, each module has an inter-module communication device, such as a pair of infrared (IR) LED diodes and photo detectors on each face, enabling each module to communicate with a neighboring module, forming a mesh. The system is configured to serially transmit unique identification codes from the network of lighting modules using time division multiplexing (TDM), which is considerably less costly to implement than previously known indoor positioning systems, using low cost LED's while enabling high density distribution to improve accuracy. The tag carried by each occupant detects the unique IDs of a plurality of transmitting modules, which data may be used to calculate its relative position. This information is transmitted to a processor, which accurately determines the position of the tag in the building.

While a thriving market exists for technologies designed to save energy and cost for building owners, not enough of these technologies have a low installation cost and are self-commissioning. The system and method set forth herein may allow traditional lighting manufactures and building retrofitters to provide a self-commissioning and scalable solution for indoor positioning with little additional cost to a traditional lighting retrofit or new installation, in entire buildings or areas with special needs. The system and method set forth herein may also provide up to an additional 25% energy savings by automatically controlling lights and other energy consuming infrastructure (e.g., HVAC systems, office appliances, etc.) based on occupant presence. Moreover, the system and method set forth herein provides greater security than previously known indoor positioning systems due to the use of VLC, and offers increased tracking fidelity across an entire structure (not just per zone) with lower cost, while still preserving occupant privacy (i.e., no vision systems).

Large commercial, private and government buildings stand to benefit from Smart Buildings technologies, in which sensor data enable various aspects of the building to adjust energy use based on local occupant behavior. Commercial buildings alone account for about 20% of the entire U.S. energy consumption. However, the technologies to enable building-wide readings of occupant behavior are expensive to implement, not to mention expensive and complicated to calibrate and maintain. Besides energy reduction, certain private and government buildings require secure solutions to tracking occupants throughout the entire structure for security reasons. Some of the use cases why companies would want to adopt an IPS as part of a lighting solution as described herein include increased efficiency related to real-time progress updates, ensuring compliance with governmental regulations such as ensuring required breaks are being observed for workers, ensuring that their internal policies are being followed and that manually recorded worker timesheets are accurate without the privacy concerns associated with comprehensive video/audio surveillance. For hospitals, the ability to determine patient flow and staff locations can help streamline staffing, improve process automation, and eliminate operational bottlenecks, in addition to reducing legal costs associated with ensuring admitted patients are only where they should be, especially in high-risk areas. Furthermore, the Federal Communications Commission is actively interested in IPS to enhance emergency response. Additional uses for systems and methods employed as set forth herein in retail spaces include location aware advertising and customer engagement.

In accordance with certain aspects of an embodiment of the invention, a system is provided for detecting a location of a mobile receiver, comprising a plurality of lighting modules each having a light source configured to provide visible light communication data signals to a mobile receiver, wherein the plurality of lighting modules are in data communication with one another so as to transmit unique lighting module identification codes from the plurality of lighting modules; and a mobile receiver having a photodetector and a transmitter, and mobile receiver computer code configured to determine lighting module identification codes from visible light signals transmitted from the plurality of lighting modules, and to transmit data representative of determined lighting module identification codes to one or more of the lighting modules, such that the mobile receiver and the one or more lighting modules carry on two-way communication; wherein the plurality of lighting modules further comprise one or more processors having computer executable code stored thereon configured to receive the data from the mobile receiver representative of determined lighting module identification codes, and to determine a physical location of the mobile receiver based on the data representative of determined lighting module identification codes and data representative of a physical location of the plurality of lighting modules.

In accordance with further aspects of an embodiment of the invention, a method is provided for detecting a location of a mobile receiver, comprising the steps of: providing a plurality of lighting modules each having a light source configured to provide visible light communication data signals to a mobile receiver, wherein the plurality of lighting modules are in data communication with one another so as to transmit unique lighting module identification codes from the plurality of lighting modules; providing a mobile receiver having a photodetector and a transmitter, and computer code configured to determine lighting module identification codes from visible light signals transmitted from the plurality of lighting modules, and to transmit data representative of determined lighting module identification codes to one or more of the lighting modules, such that the mobile receiver and the one or more of the lighting modules carry on two-way communication; wherein each lighting module further comprises one or more processors having computer executable code stored thereon configured to receive data from the mobile receiver representative of determined lighting module identification codes such that the mobile receiver and one or more of the lighting modules carry on two-way communication, and to determine a physical location of the mobile receiver based on the data representative of determined lighting module identification codes and data representative of a physical location of the plurality of lighting modules; transmitting visible light communication data signals from the plurality of modules; receiving at at least a first one of the processors a data transmission from the mobile receiver comprising lighting module identification codes received by the mobile receiver from the lighting modules; and determining at the first one of the processors a physical location of the mobile receiver.

In accordance with still further aspects of an embodiment of the invention, a method is provided for detecting a location of a mobile receiver, comprising the steps of: providing a plurality of lighting modules each having a light source configured to provide visible light communication data signals to a mobile receiver, wherein the plurality of lighting modules are in data communication with one another so as to transmit unique lighting module identification codes from the plurality of lighting modules; wherein each lighting module further comprises one or more processors having computer executable code stored thereon configured to receive data from the mobile receiver representative of determined lighting module identification codes such that the mobile receiver and one or more of the lighting modules carry on two-way communication, and to determine a physical location of the mobile receiver based on the data representative of determined lighting module identification codes and data representative of a physical location of the plurality of lighting modules; transmitting visible light communication data signals from the plurality of modules; receiving at at least a first one of the processors a data transmission from the mobile receiver comprising lighting module identification codes received by the mobile receiver from the lighting modules; and determining at the first one of the processors a physical location of the mobile receiver.

BRIEF DESCRIPTION OF THE DRAWINGS

The numerous advantages of the present invention may be better understood by those skilled in the art by reference to the accompanying drawings in which.

DETAILED DESCRIPTION OF THE PREFERRED EMBODIMENTS

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Disclosed herein are systems and methods for providing indoor position detection using an array of visible light communication lighting modules that transmit a visible light data signal to a mobile receiver, which mobile receiver then transmits data received from multiple lighting modules to a processor that determines the position of the mobile receiver, and thus of any person or item that is carrying the mobile receiver. Such systems and methods provide for position detection in indoor environments, where GPS or other position location technologies are difficult to implement, and in addition to providing for position detection provide a high efficiency light source for the indoor environment in which the position of persons or items is to be tracked.

Figure 1:
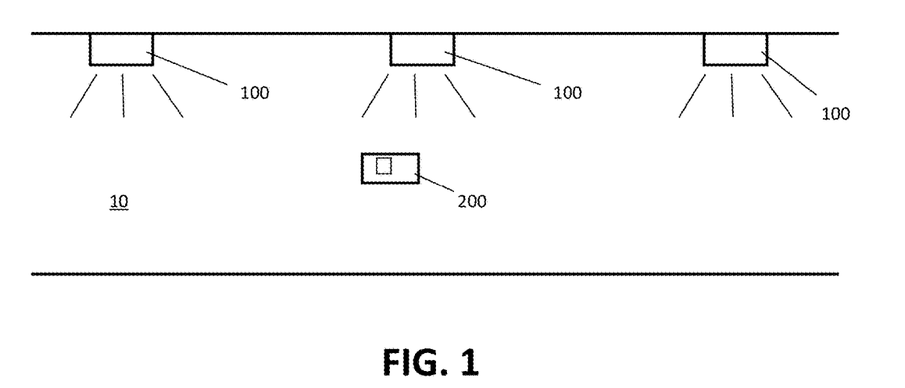
FIG. 1 is a schematic view of an indoor position system in accordance with certain aspects of an embodiment of the invention.

In accordance with certain aspects of an embodiment of the invention and with reference to FIG. 1, an indoor position system includes a plurality of lighting modules 100 that are communicatively interconnected with one another and preferably mounted on the ceiling of a room or hallway 10, with each lighting module having a light source capable of modulating light so as to provide visible light communication (VLC) with a mobile receiver 200. The mobile receiver may, in accordance with further aspects of an embodiment, comprise a portable tag or badge that may be attached to a person, an item of furniture, or anything else that one might wish to track inside of a building or other structure. Each mobile receiver 200 includes a photodetector that receives the visible light communication data signal from multiple lighting modules 100, and a processing device (e.g., a microcontroller) that detects, from the received visible light communication signals, a unique identifier of the lighting modules 100 from which it has received such visible light communication signals. Each mobile receiver 200 also includes a transmitter that transmits such detected unique identifiers to a position processor that processes such data to determine the position of the mobile receiver.

Once determined, the position of such tag may be used to, by way of non-limiting example, determine and track the position of occupants within a building, such as employees, visitors, and the like, or of items of special interest, such as mobile supply cabinets, portable machinery, hospital patient beds, or any other item whose position it may be desirable to track within a building and to which a small tag or badge embodying the mobile receiver may be attached. As discussed in greater detail below, lighting modules 100 are interconnected to form a mesh network communication system enabling individuals and items of interest to be tracked from room-to-room and floor-to-floor in a comprehensive, accurate, and efficient manner.

A system configured in accordance with at least certain aspects of the invention will utilize high-efficiency lighting to implement indoor position tracking for security purposes and for intelligent building operations, in a manner suitable for both new construction and for building retrofits, at little more than the cost of the conventional lighting installation. Such a system may fit a current demand among commercial and government buildings to integrate technologies (in both new construction and retrofit projects) that reduce energy consumption. Given the typically high energy demand of lighting, and the increasing demand in both commercial and government buildings to keep track of building occupants for both security and safety reasons, a system and method implemented in accordance with certain aspects of the invention will enable lighting manufacturers to meet such needs by providing energy efficient lighting options for new construction and retrofits that provide an additional layer of occupant tracking for security, safety, and energy efficiency at little additional cost. Moreover, such systems may be well suited to provide such occupant tracking even in secure environments, in which the risk of leakage of radio frequency data (often used for occupant tracking applications) may be significantly reduced, if not altogether eliminated.

Figure 2:
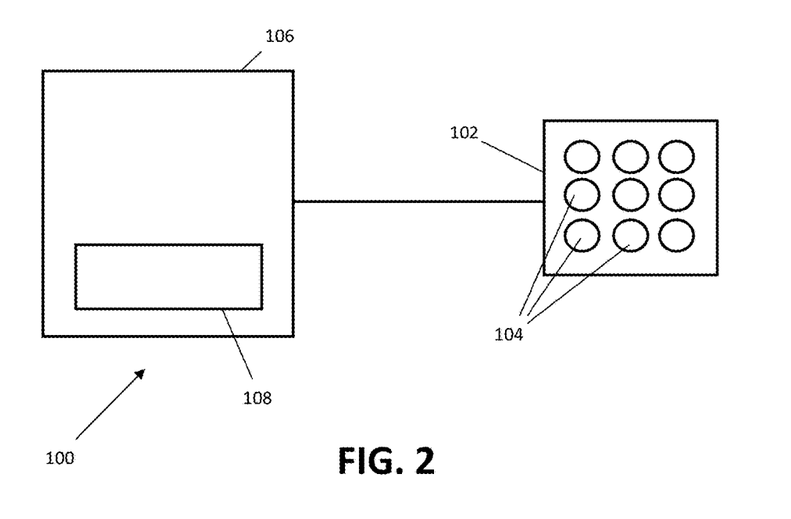
FIG. 2 is a schematic view of a lighting module for use with the system of FIG. 1.

FIG. 2 is a schematic view of a single lighting module 100 in accordance with certain aspects of an embodiment of the invention. Each lighting module 100 includes a bank 102 of high lumen visible light communication light emitting diodes (LED's) 104 that both provide illumination and that communicate via VLC with mobile receiver 200. Each lighting module 100 also includes a controller 106 capable of controlling LED's 104 so as to generate a desired VLC data signal. Controllers capable of generating such control signals to drive VLC LED's are well known to those skilled in the art, and are thus not further detailed here. In addition to having such circuitry as is necessary to generate the desired VLC signal through LED's 104, controller 106 also includes one or more inter-module communication devices 108 configured for communication with adjacent lighting modules 100. Such inter-module communication device 108 may comprise an infrared communication device enabling infrared communication between adjacent lighting modules 100. More particularly, such inter-module communication device 108 may comprise an LED infrared transmitter and detector, such as a pair of infrared LED diodes and photo detectors, positioned on each lighting module 100 so as to provide a line-of-sight to an adjacent lighting module's communication device 108.

Figure 3A:
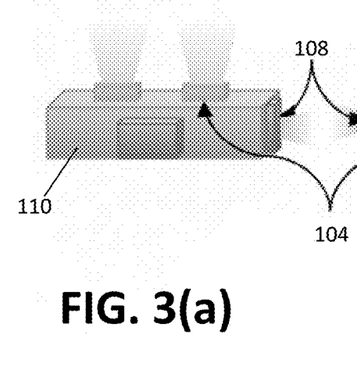
FIG. 3(a) is a side view of a lighting module according to certain aspects of an embodiment of the invention.
Figure 3B:
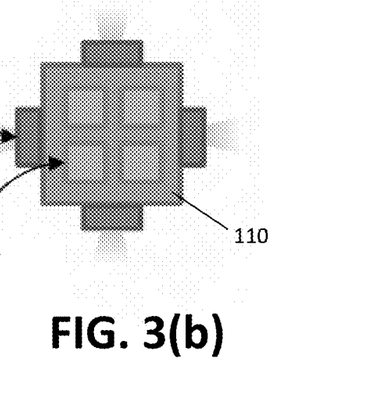
FIG. 3(b) is a bottom view of the lighting module of FIG. 3(a).

FIG. 3(*a*) shows a side view, and FIG. 3(*b*) a bottom view, of a lighting module 100 in accordance with certain aspects of an embodiment, which lighting module 100 may be suitable for use in new construction. As shown in FIGS. 3(*a*) and 3(*b*), controller 106, LED's 104, and multiple inter-module communication devices 108 may be provided on a single housing 110. It is noted, however, that bank 102 of LED's 104 may alternatively be a pre-existing LED lighting fixture, and controller 106 may be provided separately from and in electrical communication with such pre-existing lighting fixture, in those situations in which a facility is to be retrofit to employ systems and methods set forth herein. In such configurations, adjacent controllers 106 are likewise positioned so that their respective inter-module communication devices 108 maintain line-of-sight with an adjacent controller 106. In either configuration, in the event that physical building elements might block line-of-sight access to an adjacent module, optionally inexpensive cabling, such as optical fibers or other physical data communication connections, may be used as a bridge between such obstructed, adjacent lighting modules 100.

Figure 4:
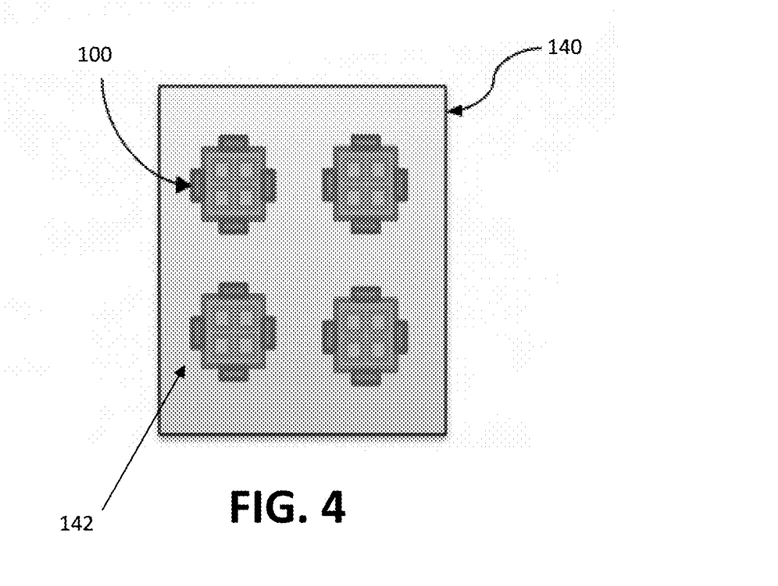
FIG. 4 is a schematic view of a group of lighting modules of FIGS. 3(a) and 3(b) installed on a ceiling tile.

FIG. 4 shows an exemplary configuration in accordance with certain aspects of an embodiment in which four lighting modules 100 are mounted to the bottom face of a standard ceiling tile 140 to form a VLC group 142, providing a suitable installation for both new buildings and retrofit installations. Moreover, and with reference to FIG. 5, multiple ceiling tiles 140 in a specified space within a building structure may each have VLC groups 142 of four lighting modules 100 mounted thereon, with all of the VLC groups 142 of lighting modules 100 within such specified space being communicatively chained together to allow data communication among all lighting modules 100 in such specified space, and thus defining a VLC chain 146. The specified space might comprise, by way of non-limiting example, a single room, a single hallway or selection of interconnected hallways, or such other segment of a building as may be desirable for a given installation. Likewise, adjacent specified spaces within a building may each have their own VLC chain 146, with adjacent VLC chains 146 likewise communicating with one another, either through communication devices 108, wired communication, or such other data communication as may be suitable to a particular installation.

Figure 5:
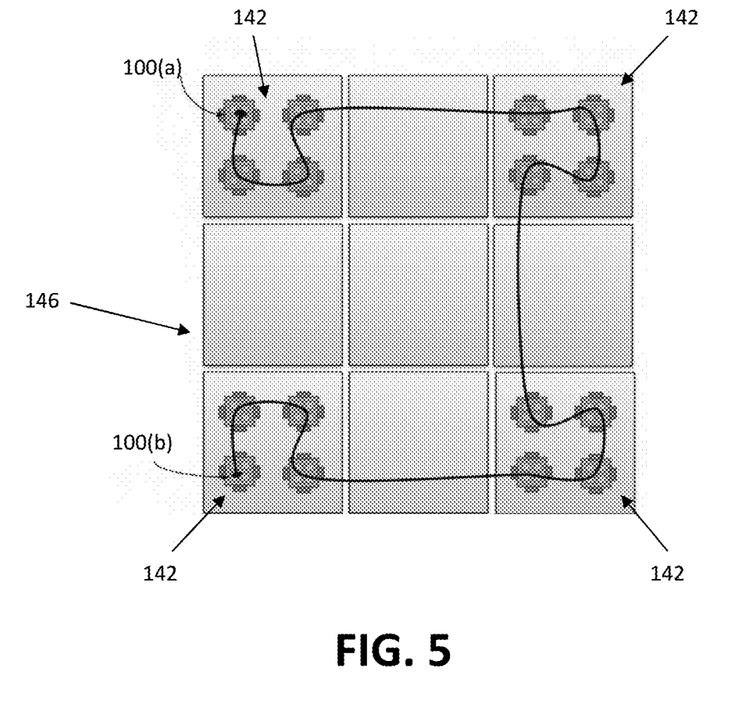
FIG. 5 is a schematic view of a chain of lighting modules of FIGS. 3(a) and 3(b) defining a visible light communication chain.

Each lighting module 100 is assigned a unique identification code. Similarly, each lighting module of a single VLC group 142 is assigned a unique group code for that VLC group 142. As shown in FIG. 5, VLC groups 142 of a VLC chain 146 are arranged for serial line-of-sight communication, with a first lighting module 100(*a*) being assigned the position of "head of chain," and a last lighting module 100(*b*) being assigned the position of "tail of chain." Such unique identification code, which may either be set as a factory setting or programmed by a system administrator, is transmitted to mobile receiver 200 through VLC so as to allow mobile receiver to identify each of those individual lighting modules 100 that are currently visible to mobile receiver 200.

In addition to defining unique identifiers for each lighting module, the system must also define a chain of communication through VLC chain 146, such that each lighting module 100 can generate and transmit its own unique signal at its own separate turn. To effect such individual and separate VLC transmission from the lighting modules 100 throughout a VLC chain 146, a commission step is first carried out to establish the order for signaling from the individual lighting modules 100 in that VLC chain 146. A virtual token (i.e., a communication data packet) is initialized at the lighting module 100(*a*) in the "head of chain" position to the starting group code (i.e., the assigned group code of the "head of chain" lighting module 100) and the unique identification code of the next lighting module 100 in the VLC chain 146, which may be designated by a system administrator. Such virtual token is then broadcasted by the "head of chain" lighting module 100(*a*), for example using all four of its inter-module communication devices 108. Upon receipt of the virtual token, the lighting module 100 whose unique identification code matches the identification code indicated in the virtual token then transmits, using VLC, its own unique identification code using bank 102 of LED's 104 associated with that particular lighting module 100, modifies the virtual token to reflect the next unique identification code in the VLC chain 146, and rebroadcasts the virtual token in the same manner as set forth above. This process is repeated until the "tail of chain" lighting module 100(*b*) receives the token, which then modifies the virtual token by setting the next identification code to the identification code of the previous module in the VLC chain 146, and toggles the direction of transmission to indicate that the virtual token will be travelling in the reverse direction. This sequence is then repeated when the virtual token arrives at "head of chain" lighting module 100(*a*) so as to cause the virtual token to continuously travel up and down the path of VLC chain 146. Through this method, the VLC transmitted by each lighting module 100 in the VLC chain 146 is time division multiplexed based on the location of the virtual token, such that at any time there is only one unique coded signal being send out from one lighting module 100 in the VLC chain 146, which in turn reduces packet collision at mobile receiver 200.

Figure 6:
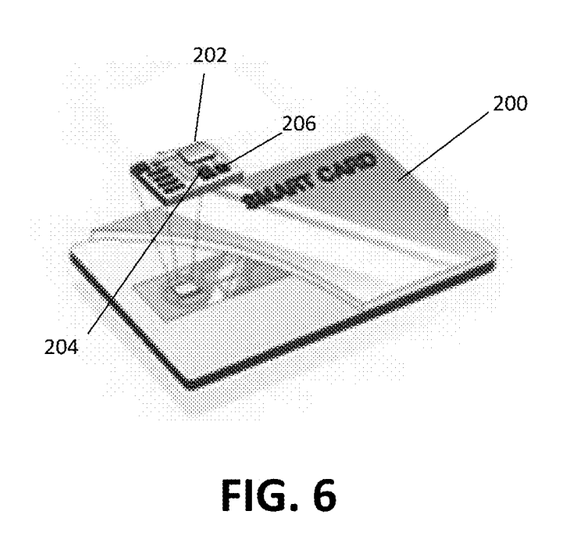
FIG. 6 is a schematic view of a mobile receiver for use with the system of FIG. 1.

Next, and as shown in the schematic view of FIG. 6, mobile receiver 200 may be provided in the form of a card that may be carried, by way of non-limiting example, as a badge, such as an employee's security or access badge. Each mobile receiver 200 preferably includes a photodetector 202, a microcontroller 204, and a mobile receiver communication device 206. Photodetector 202 may be of standard configuration and is able to detect a VLC data signal transmitted from a lighting module 100 within sight of such photodetector 202. Photodetector 202 may comprise a photodiode, as opposed to a CMOS receiver, offering significantly lower cost and easier implementation than previously known systems. Microcontroller 204 is provided computer code configured to receive such VLC data signal and to detect from such signal the unique identification codes of lighting modules 100 that are within sight of photodetector 202 at any given time, which obviously will change as the person or item carrying mobile receiver 200 moves. Finally, mobile receiver communication device 206 is configured to transmit such data to a processor, which processor may (using known triangulation techniques) determine the position of the mobile receiver based upon the specific lighting modules 100 that it sees at any given time. More particularly, through proper physical placement of lighting modules 100 in a space, the mobile receiver 200 may be assured of seeing transmissions from three or more lighting modules 100 at any one time (assuming of course that photodetector 202 is not covered). Mobile receiver 200 then rebroadcasts that data—i.e., data identifying those unique module identification codes that it received—to a processor for determination of the mobile receiver's location using triangulation to determine the union of all possible places the tag might be in order to be able to see all of the identified modules. A database containing the physical location of each lighting module 100 is maintained, and based upon the known physical location of each lighting module 100, the position of a mobile receiver 200 in sight of at least three of such lighting modules 100 may readily be calculated.

Figure 7:
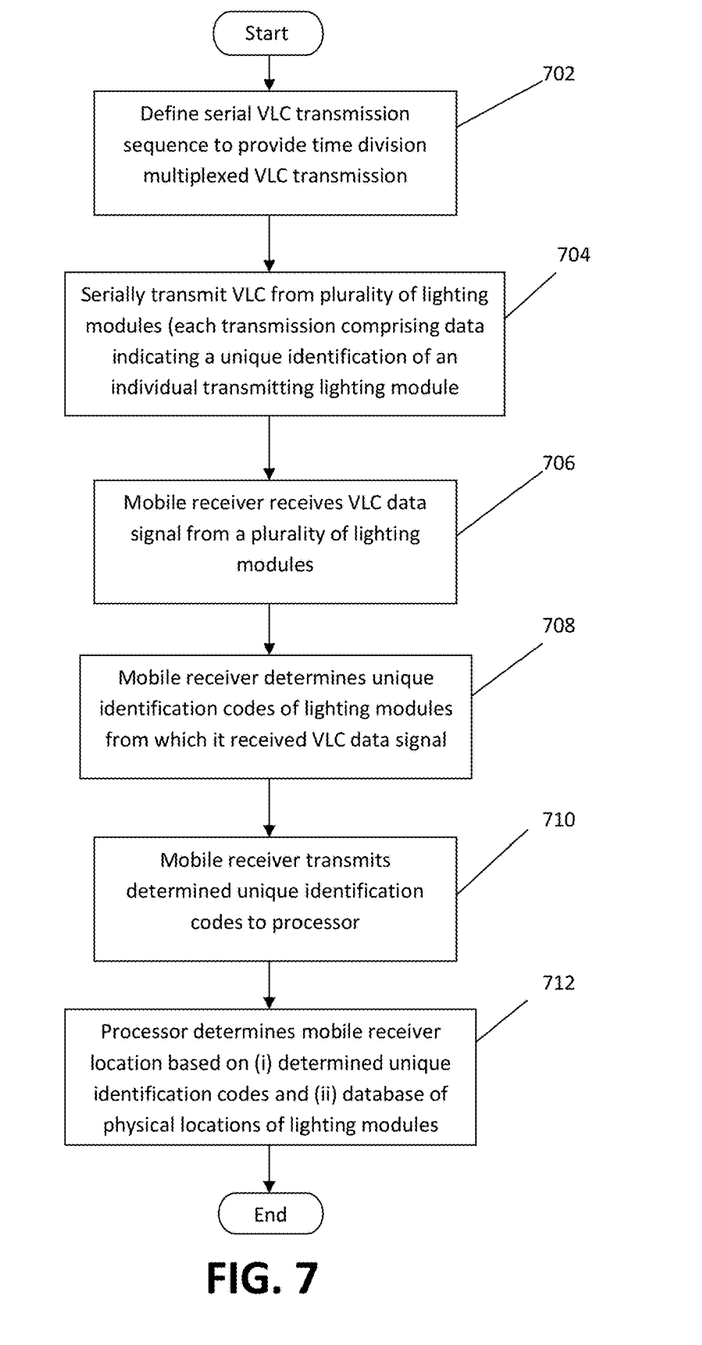
FIG. 7 represents an exemplary method in accordance with certain aspects of an embodiment of the invention.

FIG. 7 is a schematic view of an exemplary method that may be used to determine indoor positioning of a person or object in accordance with further aspects of an embodiment of the invention. At step 702, the system initiates commissioning of the lighting modules 100 in a VLC chain 146 to define the serial VLC transmission sequence of those lighting modules 100 so as to create a time division multiplexed VLC transmission. Next, at step 704, the system serially transmits VLC data messages from a plurality of lighting modules 100, in which each transmission comprises data indicating a unique identification code of an individual transmitting lighting module 100. Next, at step 706, a mobile receiver 200 receives the VLC data signal from a plurality of lighting modules 100. Next, at step 708, the mobile receiver 200 determines the unique identification codes of the lighting modules 100 from which it received VLC data signals. Next, at step 710, the mobile receiver 100 transmits the determined unique identification codes to a processor, which may comprise a remote server or a distributed computing network comprised of VLC chain 146, as discussed in detail below. Finally, at step 712, the processor determines the mobile receiver 100 location based on (i) the determined unique identification codes, and (ii) a database of physical locations of lighting modules 100.

In order to decode the VLC signal from a lighting module 100, mobile receiver 200 preferably compares the amplified voltage from its phototransistor with a set threshold. A desired threshold changes as the ambient lighting conditions change within the environment. Thus, in accordance with certain aspects of an embodiment, with each clock cycle of the mobile receiver's microcontroller, the sampled photo transistor voltage value is stored within a buffer of fixed length at an index position one integer value higher than the previous position. If the previous position was the last available position within the buffer, the index position is reset to zero. At each clock cycle, the ambient light is determined by obtaining the running average over the photo transistor voltage buffer. In order to reduce the calculations required, each time a new voltage value is sampled, the value that is stored in the array is preferably added to an accumulator and the value that was just replaced in the array is subtracted from the accumulator. The ambient light may be determined by dividing the accumulator by the length of the buffer. The optimal length of the buffer may be determined by applying a formula consisting of the data transmission rate and the length of the data symbol.

An estimate of the location of a mobile receiver 200 may be further refined based upon the intensity of incident light from a lighting module 100 striking the mobile receiver 200 and the mobile receiver's orientation with respect to that lighting module 100. More particularly, a rough estimation of the position of a mobile receiver 200 can be determined as the weighted average position of each visible module. The weight assigned to each lighting module 100 depends upon the intensity of the light received by the mobile receiver 200 that originates from that lighting module 100 at the mobile receiver's position. However, because the sensitivity of most phototransistors is not uniform across all incident angles, in a preferred embodiment the calculation for the weight takes the incident angle into consideration. Thus, mobile receiver 200 may include an accelerometer or similarly configured device that determines the orientation of the mobile receiver 200 relative to the ray perpendicular to the lighting constellation. Using standard geometric functions, this orientation value is used to extrapolate the attenuation factor of the incident light. This attenuation factor is then used to compensate for the loss in intensity based on the incident angle, and then to determine the approximate distance of the mobile receiver 200 from the lighting module 100, and thereby determine the appropriate weight to assign to that lighting module 100. The mobile receiver 200 may deduce the light intensity for a given lighting module 100 by extracting the difference between the ambient light and the light contributed by the lighting module 100 associated with a given unique id. With this data, a more refined estimate of the position of the mobile receiver 200 may be obtained.

In a basic implementation, mobile receiver 200 may transmit such data through mobile receiver communication device 206 to a remote server. For instance, mobile receiver communication device may comprise a WiFi radio, which may communicate with such a remote server. In this configuration, the remote server receives the unique identification codes and, as discussed above, uses basic triangulation to determine the position of the mobile receiver 200.

Unfortunately, however, such WiFi transmission may represent undesirable RF leakage, even in those cases in which the transmission is encrypted. Thus, to provide additional data security, and in accordance with a particularly preferred embodiment of the invention, mobile receiver 200 may alternatively transmit such data through mobile receiver communication device 206 to VLC chain 146, and more particularly to the nearest lighting module 100 in VLC chain 146. Thus, lighting modules 100 and mobile receiver 200 carry on two-way communication in which the lighting modules transmit their respective identification codes to the mobile receiver 200, and mobile communication device 206 of mobile receiver 200 transmits its determined unique identification codes back to lighting modules 100, with the information identifying the mobile receiver and its location both being stored and processed entirely within the mesh network defined by lighting modules 100. Such localized storage and processing of data corresponding to the mobile receiver's location eliminates the risks associated with transmitting to a remote server, such as the risk that such data might be intercepted by unauthorized third parties.

In this configuration, both processing of such data to determine the physical location of mobile receiver 200, and storage of such location data, are carried out in a distributed computing environment comprised of interconnected controllers 106 of lighting modules 100 within the VLC chain 146, thus eliminating the need for a remote server. Also in this configuration, communication from mobile receiver 200 to controller 106 may be carried out by way of RF communication, WiFi communication, infrared, VLC, BLUETOOTH, ZIGBEE, or such other lower power data communication system currently available or as may become available in the future, with low power transmission configurations such as BLUETOOTH and ZIGBEE currently being preferred.

In the event that such processing is carried out in the distributed computing environment offered by lighting modules 100 themselves, a small computing device configuration, such as one using computing devices as simplistic as the popular RASPBERRY PI computing devices, could readily be configured by those skilled in the art to employ the processes set forth herein—namely, keeping track of the information received from one or more mobile receivers 200 and relevant information on lighting modules 100 in the VLC chain 146 (i.e., a database maintaining the physical location of each lighting module 100, associated unique identification codes, and VLC transmission sequence). That distributed computing system saves data indicating that a particular mobile receiver 200 was logged into a given location (i.e., a particular portion of a specified space in the building) within a particular time window, and would store such data for a user-designated period of time, and optionally periodically transmit such data to remote data storage, such as a cloud storage network or the like (with lighting modules 100 likewise serving as gateway devices to the cloud).

When employing the foregoing distributed computing configuration in which the lighting network itself provides the computing environment for determining the location of the mobile receiver 200 and for storing such information, the distributed computing environment is responsible for the creation, management, and transmission of the data packets that include the identification and location information associated with the mobile receiver 200. As mentioned above, the lighting modules 100 are placed into logical groupings form the VLC chain 146, wherein each module 100 coordinates the transmission of its VLC data packet based on the receipt of a token, which is passed from lighting module to lighting module within the VLC chain 146 through infrared transmitters and receivers. The token traverses the chain of modules 100 from the master module to the slave module and then returns to the master module.

Figure 8:
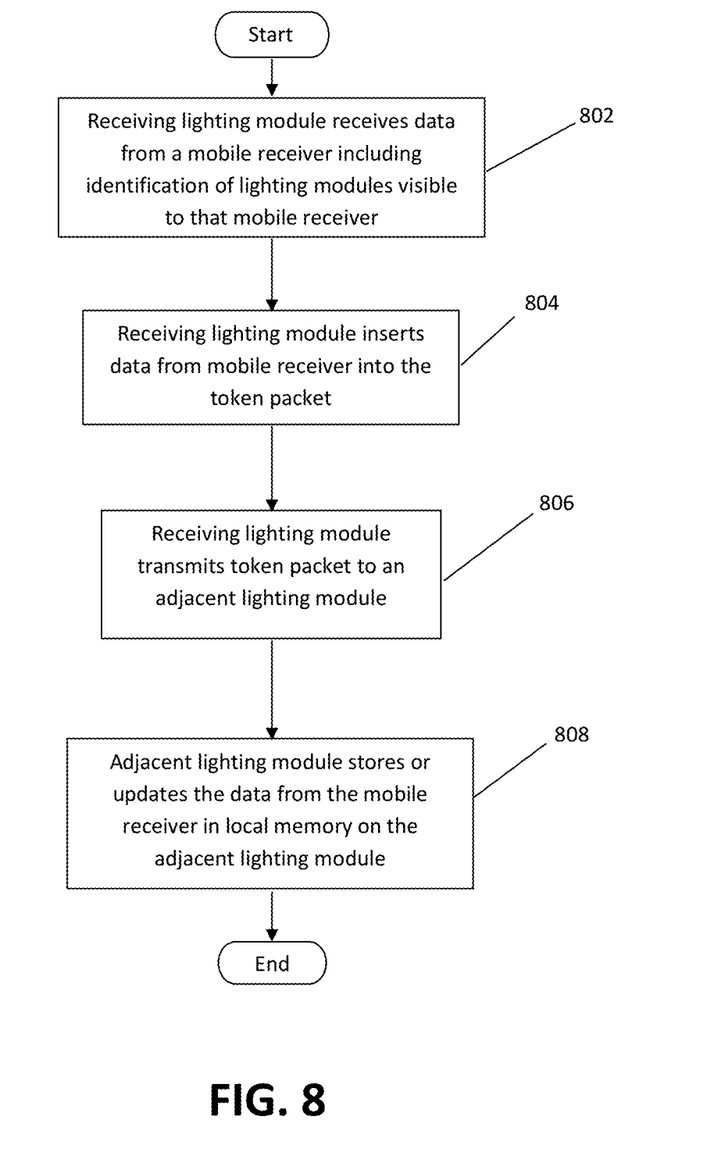
FIG. 8 represents an exemplary method for managing data relating to the location of a mobile receiver entirely within the mesh network formed by lighting modules 100 in accordance with certain aspects of an embodiment of the invention.

As shown in FIG. 8, and in accordance with certain aspects of an embodiment, the VLC chain 146 implements mesh networking over such token message passing protocol. First, all communication between modules 100 is preferably encrypted using asymmetric cryptography, wherein each module 100 contains a private key, which is unique to the chain and embedded in firmware, and a public key that is established by the master module. The token networking packet contains information about the chain's ID, the direction of the token, the last lighting module visited, and finally a data payload. The data payload holds the information to be stored within the lighting constellation and may consist of a unique mobile receiver ID and a set of lighting module IDs for lighting modules 100 that are visible to that mobile receiver 200. This payload preferably only persists for x number (which number may, for example, be determined and set by a system administrator) of hops beyond the point of insertion into the chain.

Once information is received by a lighting module 100 from a mobile receiver 200 (i.e., data concerning the module IDs within the lighting constellation visible to that mobile receiver 200) at step 802, the receiving lighting module 100 at step 804 inserts the data into the token packet before it is sent at step 806 down or up the VLC chain 146. This ensures that the data persists in the most immediate neighboring lighting modules 100. When a neighboring lighting module 100 receives the token, at step 808 it stores or updates the data in local flash memory and either passes the data to the next lighting module 100 in the VLC chain 146, or strips it from the token packet (after the number of hops exceeds x). If the receiving lighting module's flash memory is at capacity (i.e., it cannot store the data), it does not strip the data payload.

Further, using the data collected by such mesh network reflecting location of a mobile receiver 200, individuals may query such data in order to determine the location of the tagged person or items of interest at a particular time. In the server configuration discussed above, this may be easily implemented by a user simply connecting to the server, via their own computing device, to query the stored data. If the system is implemented in the preferred distributed computing mesh network configuration in which the modules themselves process and store the data (which provides a much more secure scenario so that employee locations are not stored on a potentially accessible storage device), the intended querying device, such as a user's phone, may transmit the query to the physically closest lighting module 100 via, e.g., BLUETOOTH, RF, etc., and that closest module then sends out the query so that it propagates through all modules, to ultimately respond back to the user's phone. Preferably, each lighting module's response is appended so that a record may be maintained of the physical path the query took to locate the queried tag, and then route the response back through the most direct route to the user's phone.

Figure 9:
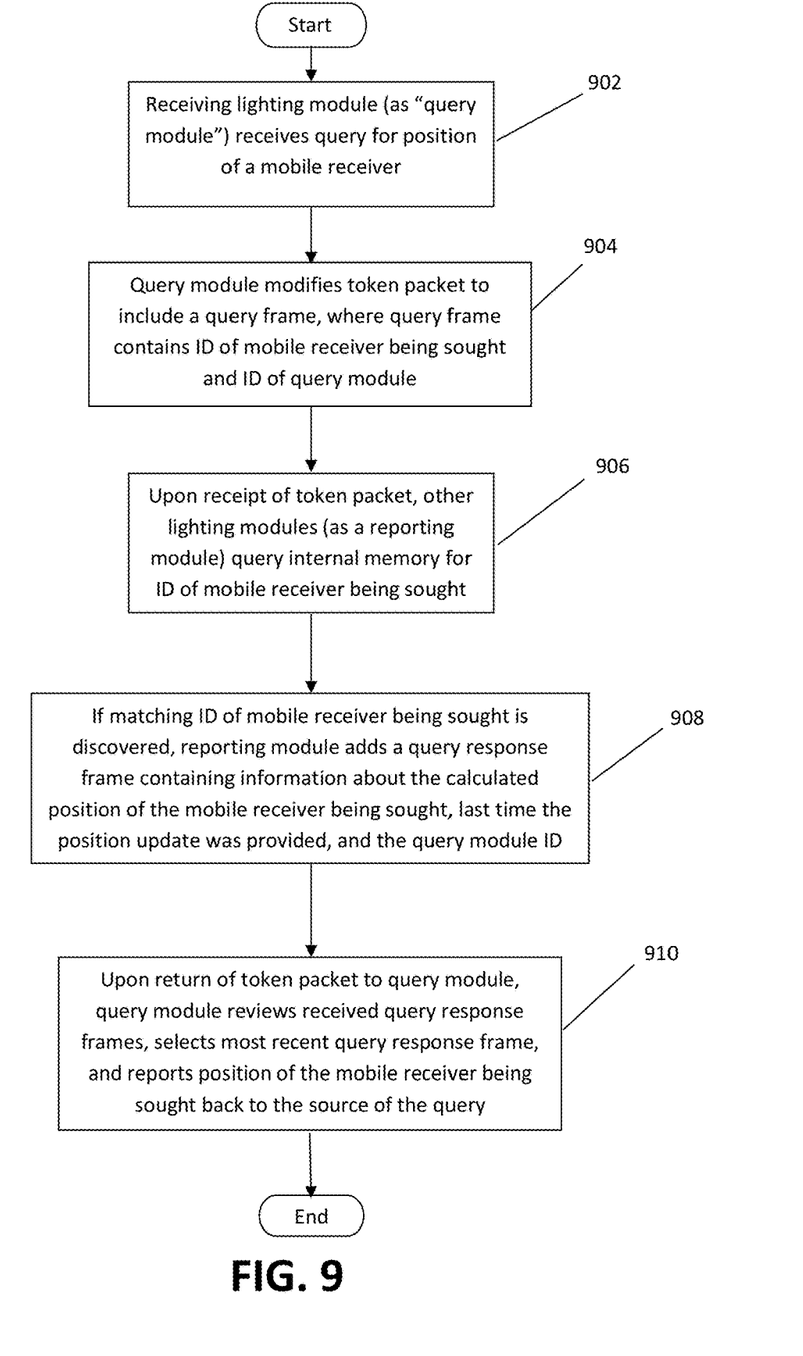
FIG. 9 represents an exemplary method for processing queries issued to the mesh network formed by lighting modules 100 in accordance with certain aspects of an embodiment of the invention.

FIG. 9 provides a schematic view of such method for processing queries by the mesh network comprised of lighting modules 100. When information is needed from the lighting constellation (e.g., a position of a particular mobile receiver 200 is requested), the query may be received at step 902 from any lighting module 100 within the constellation (e.g., through VLC, RF, Physical Link interface). The lighting module 100 receiving the query (i.e., the query module) at step 904 modifies the token packet to include a query frame, which contains the ID of the mobile receiver 200 being sought and the ID of the query module. At step 906, each lighting module 100 in the chain checks its internal flash memory upon receipt of the token packet. If a lighting module 100 is able to successfully match the ID of the mobile receiver 200 within the query frame to one stored in local flash memory, acting in the capacity of a reporting module, at step 908 it adds a query response frame that contains information about the calculated position of the mobile receiver 200 with that ID, the last time the position update was provided, and the query module ID. When the token packet finally returns to the query module at step 910, it reviews all received query response frames and selects the one with the most recent time. The mobile receiver's position data from the selected query response frame is then reported, preferably by transmitting such position data back to the client that originally requested the data (over VLC, RF or Physical Link).

If the token packet does not contain a query response frame when it returns to the query module, it appends the query frame with a flag that indicates that an inter-chain request is desired. Any lighting module 100 that receives the token packet with this flag set will send out a special IR packet that is not tied to the token. This packet is essentially a broadcast to all lighting modules 100 within IR range. The flag is removed from the token packet when it returns to the query module. The packet contains the query frame as well as the originating chain ID and time stamp generated from the query frame. All lighting modules 100 within the originating chain that may receive this packet simply ignore it. If a lighting module 100 within a neighboring chain receives this packet, it waits until it receives the token packet from its own chain and then checks to see if a query frame with the ID and time stamp from the originating chain exists in the token packet. If it does not exist in the token packet, this query frame is appended with this information in addition to the ID of the lighting module 100 that received it. This lighting module 100 then becomes the query module for that frame and the same process that occurred with the originating frame is repeated in the current chain. If the ID of the subject mobile receiver 200 is not located within the current chain, the process of inter-chain communication is repeated with the ID of the current chain appended to the query frame. If the ID of the subject mobile receiver 200 is located within a chain that is not the originating chain, then a similar inter-chain communication process is initiated with a query response frame that contains the mobile receiver's position data as well as the originating chain's ID and the query module's ID.

Through this system and method, data corresponding to the location of the mobile device being sought can be processed and stored entirely within the mesh network formed by lighting modules 100, thus significantly reducing the risk of exposing such data to unauthorized sources external to such mesh network.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A system for detecting a location of a mobile receiver, comprising:
    a plurality of lighting modules each having a light source configured to provide visible light communication data signals to a mobile receiver, wherein said plurality of lighting modules are in data communication with one another so as to transmit unique lighting module identification codes from the plurality of lighting modules; and
    a mobile receiver having a photodetector and a transmitter, and mobile receiver computer code configured to determine lighting module identification codes from visible light signals transmitted from said plurality of lighting modules, and to transmit data representative of determined lighting module identification codes to one or more of said lighting modules, such that said mobile receiver and said one or more of said lighting modules carry on two-way communication;
    wherein said plurality of lighting modules further comprise one or more processors having computer executable code stored thereon configured to receive said data from said mobile receiver representative of determined lighting module identification codes, and to determine a physical location of said mobile receiver based on said data representative of determined lighting module identification codes and data representative of a physical location of said plurality of lighting modules, wherein said computer executable code is further configured to receive, modify, and transmit a virtual token among other of said lighting modules, and wherein said virtual token includes a data payload comprising an identification of said mobile receiver and a set of lighting module identification codes of lighting modules that are in line-of-sight communication with said mobile receiver.

2. The system of claim 1, wherein said light source further comprises an LED array positioned on a housing of each said lighting module.

3. The system of claim 1, each said lighting module further comprising:
    a housing; and
    an inter-module communication device positioned on said housing.

4. The system of claim 3, wherein said inter-module communication device is positioned on said housing for line-of-sight communication with an adjacent one of said lighting modules.

5. The system of claim 4, wherein each said inter-module communication device further comprises an infrared LED and photodetector configured for transmission of data to and reception of data from an adjacent lighting module.

6. The system of claim 1, wherein said one or more processors of said plurality of lighting modules form a distributed processor architecture implemented through multiple of said lighting modules.

7. The system of claim 1, each lighting module further comprising a controller configured to receive a virtual token from a first adjacent lighting module, in response to receiving said virtual token cause said light source to transmit a unique lighting module identification code, and transmit said virtual token to a second adjacent lighting module.

8. The system of claim 1, wherein said mobile receiver further comprises a card-shaped badge configured for wearing by a human.

9. The system of claim 1, wherein said plurality of lighting modules define a communication chain, and wherein said virtual token further comprises a communication chain identification code.

10. The system of claim 9, wherein said virtual token further comprises data indicating a direction of travel of said virtual token along said communication chain.

11. The system of claim 9, wherein said virtual token further comprises a lighting module identification code of a last in time lighting module to have processed said virtual token.

12. The system of claim 1, wherein said computer executable code is further configured to: upon receiving data from said mobile receiver, insert at said receiving lighting module said data payload into said virtual token prior to transmitting said virtual token to another lighting module.

13. The system of claim 1, wherein said computer executable code is further configured to: upon receiving said virtual token from an adjacent lighting module, storing at said receiving lighting module said data payload in local memory.

14. The system of claim 1, wherein said computer executable code is further configured to: receive as input at said lighting module a query for a location of a mobile receiver; and upon receipt of a query, modify said virtual token to include a query frame containing an identification of said mobile receiver being sought.

15. The system of claim 14, wherein said computer executable code is further configured to:
    upon receipt of a virtual token including a query frame, query a local memory of said lighting module for said identification of said mobile receiver being sought.

16. The system of claim 15, wherein said computer executable code is further configured to:
    upon detecting the presence in local memory of said identification of said mobile receiver being sought, add a query response frame to said virtual token including data indicating a calculated position of said mobile receiver being sought, a last time that a position update was determined, and the lighting module identification code of said lighting module that initiated said query.

17. The system of claim 1, wherein said mobile receiver computer code is further configured to determine an amount of ambient light visible to said mobile receiver.

18. The system of claim 17, wherein said mobile receiver computer code is further configured to adjust a threshold comparative ambient light value based on said determined amount of ambient light.

19. The system of claim 1, wherein said mobile receiver computer code is further configured to adjust a light communication data signal received from one of said lighting modules based upon an angle of incidence of said light communication data signal with respect to said mobile receiver.

20. A method for detecting the location of a mobile receiver, comprising the steps of:
providing a plurality of lighting modules each having a light source configured to provide visible light communication data signals to a mobile receiver, wherein said plurality of lighting modules are in data communication with one another so as to transmit unique lighting module identification codes from the plurality of lighting modules;
providing a mobile receiver having a photodetector and a transmitter, and mobile receiver computer code configured to determine lighting module identification codes from visible light signals transmitted from said plurality of lighting modules, and to transmit data representative of determined lighting module identification codes to one or more of said lighting modules, such that said mobile receiver and said one or more of said lighting modules carry on two-way communication;
wherein each said lighting module further comprises one or more processors having computer executable code stored thereon configured to receive data from said mobile receiver representative of determined lighting module identification codes such that said mobile receiver and one or more of said lighting modules carry on two-way communication, and to determine a physical location of said mobile receiver based on said data representative of determined lighting module identification codes and data representative of a physical location of said plurality of lighting modules, wherein said computer executable code is further configured to receive, modify, and transmit a virtual token among other of said lighting modules, and wherein said virtual token includes a data payload comprising an identification of said mobile receiver and a set of lighting module identification codes of lighting modules that are in line-of-sight communication with said mobile receiver;
transmitting visible light communication data signals from said plurality of modules;
receiving at at least a first one of said processors a data transmission from said mobile receiver comprising lighting module identification codes received by said mobile receiver from said lighting modules; and
determining at said first one of said processors a physical location of said mobile receiver.

21. A method for detecting the location of a mobile receiver, comprising the steps of:
providing a plurality of lighting modules each having a light source configured to provide visible light communication data signals to a mobile receiver, wherein said plurality of lighting modules are in data communication with one another so as to transmit unique lighting module identification codes from the plurality of lighting modules;
wherein each said lighting module further comprises one or more processors having computer executable code stored thereon configured to receive data from said mobile receiver representative of determined lighting module identification codes such that said mobile receiver and one or more of said lighting modules carry on two-way communication, and to determine a physical location of said mobile receiver based on said data representative of determined lighting module identification codes and data representative of a physical location of said plurality of lighting modules, wherein said computer executable code is further configured to receive, modify, and transmit a virtual token among other of said lighting modules, and wherein said virtual token includes a data payload comprising an identification of said mobile receiver and a set of lighting module identification codes of lighting modules that are in line-of-sight communication with said mobile receiver;
transmitting visible light communication data signals from said plurality of modules;
receiving at at least a first one of said processors a data transmission from said mobile receiver comprising lighting module identification codes received by said mobile receiver from said lighting modules; and
determining at said first one of said processors a physical location of said mobile receiver.

* * * * *

UNITED STATES PATENT AND TRADEMARK OFFICE
CERTIFICATE OF CORRECTION

PATENT NO. : 10,333,620 B2  
APPLICATION NO. : 15/949208  
DATED : June 25, 2019  
INVENTOR(S) : Nyarko et al.

Page 1 of 1

It is certified that error appears in the above-identified patent and that said Letters Patent is hereby corrected as shown below:

On the Title Page

Item (72), should read:  
Kofi Nyarko, Essex, MD (US);  
Christian Emlyah, Baltimore, MD (US);  
Samuel Mbugua, Baltimore, MD (US);  
Emmanuel Shedu, Baltimore, MD (US)

Signed and Sealed this  
Seventh Day of July, 2020

Andrei Iancu  
*Director of the United States Patent and Trademark Office*